(12) United States Patent
Hutchinson et al.

(10) Patent No.: US 6,540,955 B1
(45) Date of Patent: Apr. 1, 2003

(54) PROCESS OF MAKING A SOCKET ON A PIPE OF THERMOPLASTIC MATERIAL

(75) Inventors: William George Hutchinson, Durham (GB); Hans Boer, Hardenberg (NL)

(73) Assignee: Wavin B.V., Zwolle (NL)

( * ) Notice: Subject to any disclaimer, the term of this patent is extended or adjusted under 35 U.S.C. 154(b) by 268 days.

(21) Appl. No.: 09/636,645

(22) Filed: Aug. 7, 2000

Related U.S. Application Data

(63) Continuation of application No. PCT/NL99/00079, filed on Feb. 16, 1999.

(30) Foreign Application Priority Data

Feb. 19, 1998 (NL) .............................................. 1008360

(51) Int. Cl.$^7$ ......................... B29C 57/04; B29C 57/06; B29C 61/02; B29C 61/08; B29D 23/00
(52) U.S. Cl. ...................... 264/519; 264/230; 264/296; 264/310; 264/313; 264/322
(58) Field of Search ............................... 264/230, 296, 264/310, 322, 500, 519, 313

(56) References Cited

U.S. PATENT DOCUMENTS

| 4,113,813 A | 9/1978 | Wilson |
| 4,276,010 A | 6/1981 | Shartzer |
| 4,379,115 A * | 4/1983 | Seach et al. ................. 264/296 |
| 6,146,572 A * | 11/2000 | Visscher ..................... 264/230 |

FOREIGN PATENT DOCUMENTS

| AU | 67967 74 A | 10/1975 |
| DE | 72 08 597 U | 6/1972 |
| FR | 1 089 813 | 3/1955 |
| FR | 2 375 973 | 7/1978 |
| NL | 7 908 460 | 6/1981 |
| NL | 9 400 894 | 1/1996 |
| NL | 1 002 604 | 11/1997 |
| WO | WO 97/33739 A1 | 9/1997 |

* cited by examiner

Primary Examiner—Leo B. Tentoni
(74) Attorney, Agent, or Firm—Blank Rome LLP

(57) ABSTRACT

A method of forming a socket on a pipe of thermoplastic material is disclosed. In the process, an end section of the pipe is heated in a heating station. Then, the pipe is transferred to a socket-forming station having a socket-forming mandrel. This is followed by the socket-forming mandrel being introduced into the pipe end section, heated to a suitable socket-forming temperature, and the end section being formed into a socket. Prior to the pipe end section being heated in the heating station, a support is introduced into the end section in order to internally support the end section. The support remains in the end section after the socket-forming mandrel is introduced into the pipe and in the process the support is pushed deeper into the pipe.

19 Claims, 4 Drawing Sheets

PROCESS OF MAKING A SOCKET ON A PIPE OF THERMOPLASTIC MATERIAL

CROSS-REFERENCE TO RELATED APPLICATIONS

This is a continuation application of PCT/NL99/00079 filed Feb. 16, 1999.

FIELD OF THE INVENTION

The invention relates to a method and a device for forming a socket on a pipe of thermoplastic material. In particular the invention relates to a method comprising the following steps:

an end section, to be provided with a socket, of the pipe is heated in a heating station, the pipe with the heated end section is transferred to a socket-forming station which comprises a socket-forming mandrel, the socket-forming station being set up in such that a pipe can therein be provided with a socket, while the end section of another pipe can simultaneously be heated in the heating station, the socket-forming mandrel is introduced into the pipe end section, heated to a suitable socket-forming temperature, and the end section is formed into a socket, the pipe is cooled in the region of the socket, and the socket-forming mandrel is removed from the pipe.

BACKGROUND OF THE INVENTION

In the context of the production of plastic pipes having a socket it is generally known to make use of a production installation which comprises a heating station and a socket-forming station positioned next to it. An example of this is described in U.S. Pat. No. 4,113,813.

In the case of that known installation, the pipe end section which is to be provided with a socket is first heated in the heating station, so that the end section becomes soft and readily deformable. Then the pipe with that soft end section is transferred to the adjacent socket-forming station, where the socket-forming mandrel is introduced into the soft end section and said end section is formed into the desired shape of the socket. After cooling of the socket the pipe is ready for use.

In WO 97/33739, the present applicant described a production installation which is used for forming a socket on a pipe of biaxially oriented thermoplastic material. This known installation does not have separate heating and socket-forming stations, but instead has a single station in which both the heating of the end section and the forming of the socket take place. To this end, the headmost end of the socket-forming mandrel is designed as a projecting cylindrical section which forms a socket-forming mandrel support section that fits into the pipe. In the process, the pipe is pushed onto the support section and then the end section of the pipe is heated to a suitable socket-forming temperature. Next, the socket-forming mandrel is pushed further into the pipe, so that the heated end section of the pipe slides over the socket-forming section of the socket-forming mandrel.

A drawback of the production installation of the type as shown in U.S. Pat. No. 4,113,813 is that the warm and soft end section of the pipe, when the pipe is transferred to the socket-forming station, can readily become damaged or deformed, for example indented. It should be noted in this context that even damage that at first sight appears to be of little significance can give rise to a non-uniform wall thickness or strength of the formed socket.

In the case of the production installation according to WO 97/33739, no transfer of the pipe having a heated end section to a socket-forming station takes place, so that the above-mentioned drawback thus appears to have been overcome. A disadvantage, however, is that the sockets which have been formed using said installation have inadequate quality and that the production capacity is lower than would be desirable. As regards quality, it was found that in a large number of cases cracking occurred in the sockets. Sometimes these cracks formed as early as during production, but also if the pipe was subsequently subjected to a (impact) load.

OBJECT OF THE INVENTION

It is an object of the present invention to provide a method and a device by means of which pipes of thermoplastic material, in particular of biaxially oriented thermoplastic material, can be provided with sockets of a high quality. It is also an object of the present invention to provide a method and apparatus having a high production capacity.

SUMMARY OF THE INVENTION

The present invention provides a method wherein prior to the pipe end section being heated in the heating station, a support is introduced into the end section of the pipe, said support extending substantially over the length of the end section in order to internally support the end section. According to this method the support remains in the end section, when the pipe with the heated end section is transferred to the socket-forming station, after which the socket-forming mandrel is introduced into the pipe and in the process the support is pushed deeper into the pipe.

According to a preferred embodiment the end face of the end section is thermally shielded. This measure is based on the insight that in the region of the end face of the pipe, the ratio between the external pipe surface area, which without said shielding would be exposed to the heating effect of the external heating means, and the volume of the pipe wall is greater than in that section of the pipe which is located further away from the end face. Without the shielding, more heat per unit mass of pipe material would then be supplied in the end section region than further on. This would produce a distinctly higher temperature at the outermost edge of the end section, directly next to and in the end face, than in the adjoining pipe wall sections. One of the factors involved is the poor heat conduction of the plastic. Furthermore, the end face is always found to have a rough surface, in particular as a result of the operation by means of which the pipe has been shortened to the desired length. In conjunction with the locally elevated temperature, said roughness leads to hairline cracks being formed in the region of the end face of the pipe. When the socket is formed, these hairline cracks grow into considerable cracks. The thermal shielding prevents said overheating and consequently the risk of cracking.

The present invention also provides a device for forming a socket on a pipe of thermoplastic material.

Further advantageous embodiments of the method and device according to the invention are described in the claims and in the following description with reference to the drawings.

BRIEF DESCRIPTION OF THE DRAWINGS

In the drawings:

FIGS. 2a and 2b show the preheating station of FIG. 1a;

DETAILED DESCRIPTION OF PREFERRED EMBODIMENTS

Figure 1A:
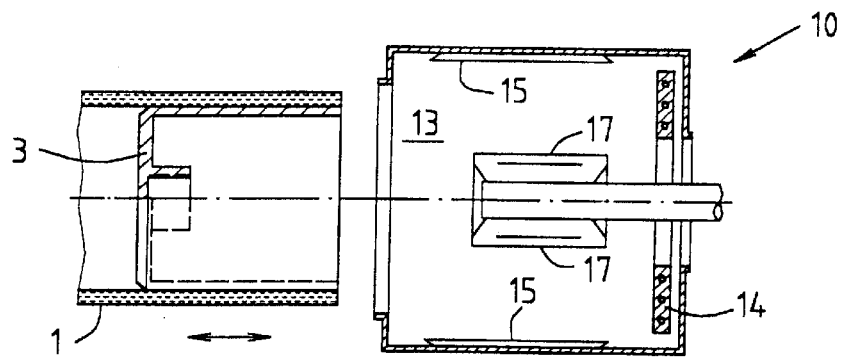
FIGS. 1a through 1c schematically show, largely as a sectional views, an installation for forming a socket on a pipe of biaxially oriented plastic material according to the invention.
Figure 1B:
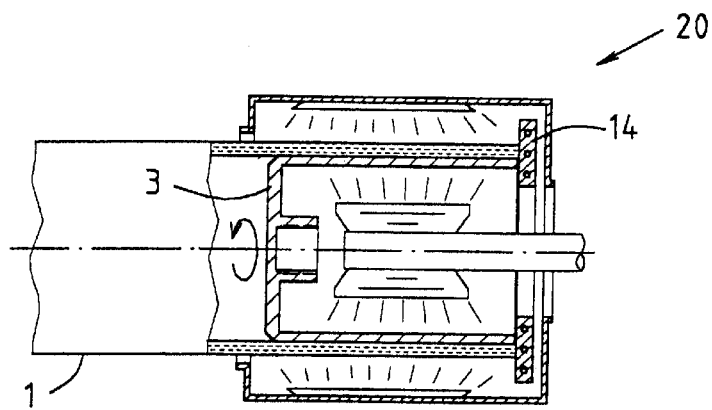
Figure 1C:
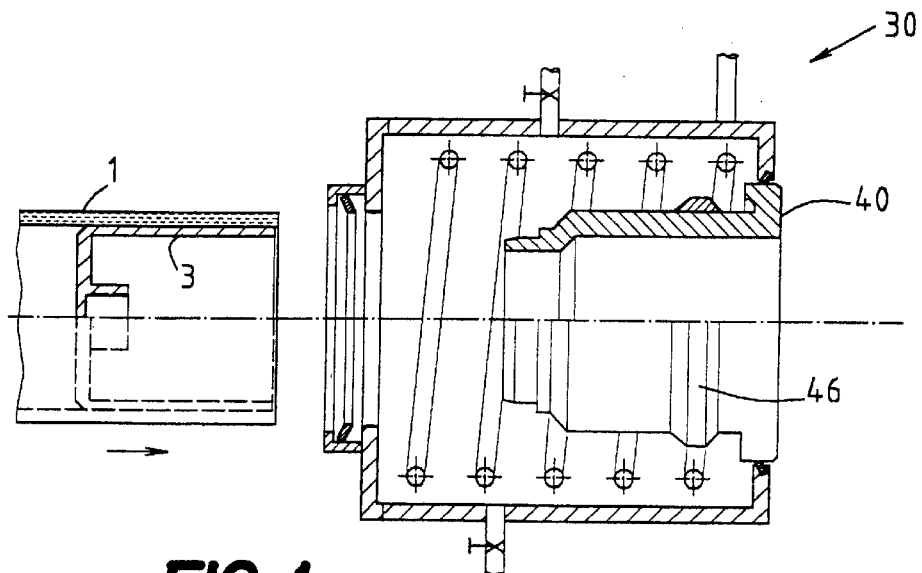

The installation shown in FIGS. 1a through 1c is designed for providing biaxially oriented pipes 1 with sockets at a high production capacity. The installation comprises three stations, i.e. a first heating station 10 (FIG. 1a), hereinafter referred to as preheating station 10, a second heating station 20 (FIG. 1b) and a socket-forming station 30 (FIG. 1c). The preheating station 10 and the second heating station 20 are of identical design, and consequently only the configuration of the preheating station 10 will be described with reference to the detailed representation of FIGS. 2a and 2b.

The preheating station 10 has a housing 11 with insertion hole 12 for the plastic pipe, which leads to an internal chamber 13 for accommodating the end section, to be heated, of the pipe 1. Situated in the chamber 13, opposite the insertion hole 12, is a shielding element 14, here in the form of a planar plate, which is mounted in such a way that the pipe 1 comes to lie against it with its end face. The plate 14 can be provided with cooling means for cooling the plate 14, for example with internal ducts through which a coolant circulates. Additionally, around the outside of the location for the end section, to be heated, of the pipe 1 there are a plurality of infrared heaters in the chamber 13, said heaters being directed towards the centre of the chamber 13 and being able to irradiate the end section of the pipe 1 from outside. Finally, one or more infrared heaters 17 are located in the centre of the chamber 13 on a rod-shaped support 18, said heaters 17 being able to heat the end section of the pipe 1 from the inside.

To implement the method, a loose support sleeve 3 is first positioned in the end section of a pipe 1 of biaxially oriented thermoplastic material, in this example of PVC. The support sleeve 3 has a thin metallic cylindrical circumferential wall 4 with an external diameter which is somewhat smaller than the internal diameter of the unheated pipe 1, and a length which is at least equal to that of the end section, to be heated, of the pipe 1. Whilst the circumferential wall 4 is thin, it has such mechanical strength that it will show no or virtually no deformation as a result of the pipe 1 shrinking upon heating. The support sleeve 3 is further provided with handling means to allow the support sleeve 3 to be placed in the pipe and later on to be removed again therefrom. In this example, the support sleeve 3 is provided with a transverse wall 5 having a central socket 6 provided with an internal thread. The circumferential wall 4 is preferably thin, so that the heat capacity of the support sleeve 3 is kept low, and is preferably made of metal, so that, by means of good heat conduction, temperature differentials in the circumferential wall 4 are avoided.

The sleeve 3 is preferably preheated in a separate oven and then placed into the end section of the pipe 1, after which the end section of the pipe 1 is introduced into the chamber 13 of the preheating station 10. Operation of the heaters 15 causes the end section of the pipe 1 to be heated externally, whilst in addition provision can be made for the heaters 17 to heat the sleeve 3 internally and thus to supply heat to the inside of the pipe 1. In the process, the pipe 1 preferably rotates about its longitudinal axis to achieve even heating. The stations 10 and 20 are provided with pipe handling means (not shown here) which are able to move the pipe 1 back and forth longitudinally and preferably are able to hold the pipe with some pressure against the shielding element 14 and at the same time can effect rotation of the pipe 1. Optionally, the plate 14 can be mounted so as to be freely rotatable so as to co-rotate with the pipe 1.

Figure 2A:
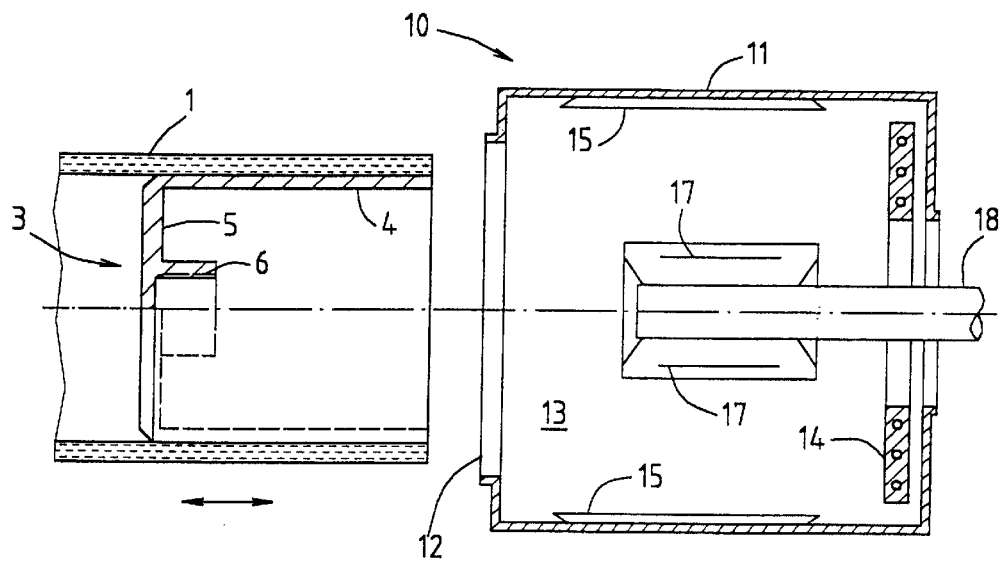
Figure 2B:
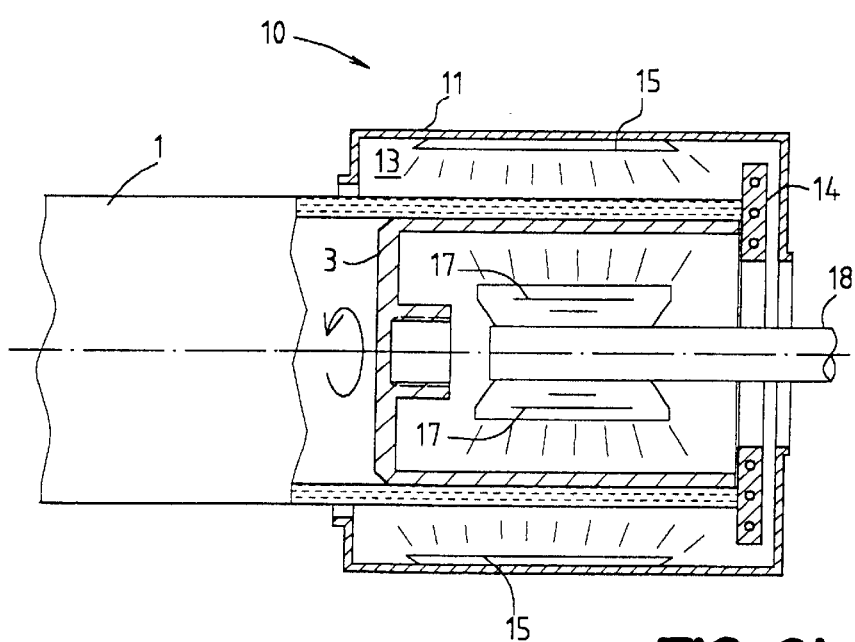

As shown in FIG. 2b, the end face of the end section of the pipe 1 lies against the shielding plate 14, thus ensuring that the end face of the pipe 1 is optimally shielded, in terms of thermal insulation, against the heating effect of the heaters 15. Even if there were a slight gap between the end face of the pipe 1 and the shielding plate 14, the effect of thermal insulation of the end face is achieved, albeit not as effectively as in the case described here where they lie completely against one another. For the PVC pipe 1 mentioned here, the preheating station 10 is adjusted so as to achieve an end section preheating temperature which roughly corresponds to the glass transition temperature of polyvinylchloride (approximately 80–85° C.). When heated to such a temperature, the biaxially oriented PVC plastic material of the pipe 1 already tends to shrink, as a result of which the support sleeve 3 is firmly gripped by the pipe 1.

Once the end section of the pipe 1 has been heated to roughly the said preheating temperature, the pipe 1 is removed from the preheating station 10 and transferred to the second heating station 20. In so doing, the support sleeve 3 remains gripped in the slightly shrunk end section of the pipe 1. During the transfer of the pipe 1 from the one station to the other, no heat is supplied to the pipe 1, so that temperature equalization, considered beneficial, can take place in the end section of the pipe 1. In particular, the end face, which had been shielded from the heaters by the plate 14, of the pipe 1 will now warm up.

To ensure that the end section of the pipe 1 will, as far as possible, uniformly attain the socket-forming temperature, said end section is now first heated further by the heaters of the second heating station 20, precisely as described with reference to FIGS. 2a and 2b. In this heating step, the end face of the pipe 1 is likewise shielded, in a thermally insulating manner, from the heaters positioned around the pipe 1 on the outside by means of the plate 14 or a similar shielding element. Moreover, the pipe 1 again rotates about its longitudinal axis during heating. When the pipe 1 is transferred to the next, the socket-forming station 30, further temperature equalization takes place.

The socket-forming temperature, ultimately to be achieved, of the end section of the PVC pipe 1 here preferably roughly corresponds to the orientation temperature of polyvinylchloride (about 110° C.), preferably slightly higher, for example 120° C. While the pipe 1 is being heated, a slight axial pressure is preferably exerted on the pipe 1 to keep its end face against plate 14, it being noted in this context that the pipe 1 will shown some shrinkage in the axial direction, which is a known characteristic of pipes of biaxially oriented plastic material.

Once the suitable socket-forming temperature of the pipe 1 has been reached, the pipe 1, with the support sleeve 3 inside it, is introduced into the socket-forming station 30. Before the operation of this station 30 is described, its design will first be discussed with reference to FIG. 3.

Figure 3:
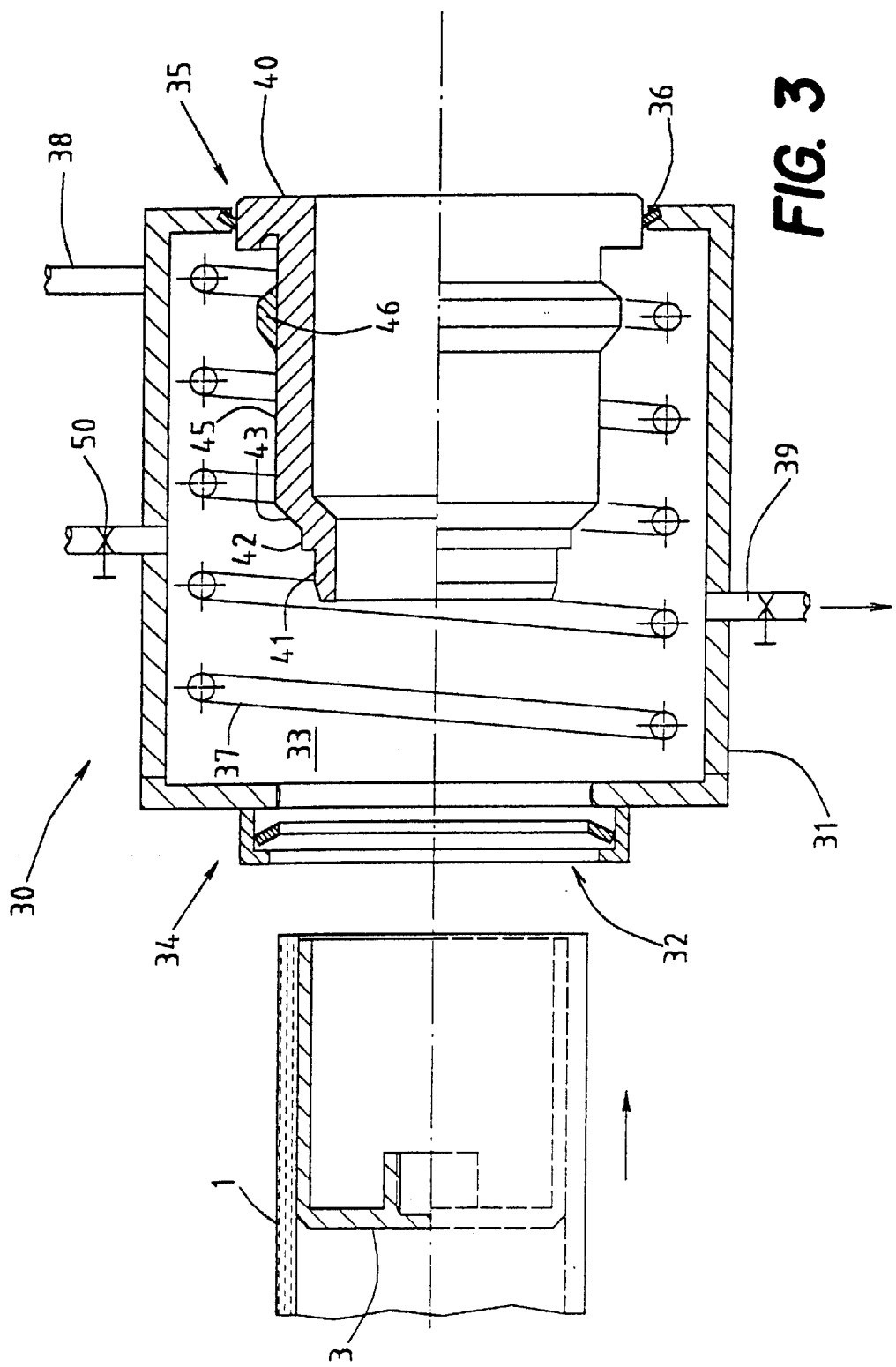
FIG. 3 shows the socket-forming station of FIG. 1c prior to the insertion of the pipe.

The socket-forming station 30 has a housing 31 with an insertion hole 32 for the pipe 1, which leads to an internal chamber 33 for accommodating the end section of the pipe 1. Present around the insertion hole 32 is a seal 34, which is able to provide an airtight seal with the outside of the pipe 1. Opposite the insertion hole 32, the housing 31 has a passage 35 for a socket-forming mandrel 40. Present around the passage 35 is a sealing ring 36, which forms an airtight seal with the external circumference of the mandrel 40 when the latter is present in the chamber 33, as is shown in FIG. 3. A translation mechanism (not shown), for example comprising a linear hydraulic cylinder, is provided for moving the mandrel 40 back and forth between the position located in the chamber 33 (FIG. 3) and a position located outside the chamber 33 (not shown).

The chamber 33 is further fitted with a coolant line 37 which is provided with spray orifices and a connection 38 for supplying cooling water or the like. The coolant line 37 here is helical and surrounds the end section of the pipe 1 when the latter is positioned in the chamber 33. Present at the bottom of the chamber 33 is a cooling water drain with an associated shut-off valve 39. Also provided is a connection 50, provided with an operator-controllable closing device 50, to supply compressed air or another, preferably gaseous, pressure medium to the chamber 33.

The socket-forming mandrel 40, at its end facing the insertion hole 32, has an accommodation section 41 for the support sleeve 3, followed by a support section 42 having the same external diameter as the support sleeve 3. The mandrel 40 further has a conical transition section 43 which forms the transition from the support section 42 to the socket-forming section 45, which has a greater diameter than the support section 42. Provided in the vicinity of the socket-forming section 45 are means (not shown here) for temporarily accommodating and retaining an elastic sealing ring 46 which is designed to form part of the socket to be formed on the pipe 1. Such means, for example, comprise a moveable retainer for keeping the sealing ring 46 fixed in place when the pipe 1 slides across it, as described in NL 9400894.

Figure 4:
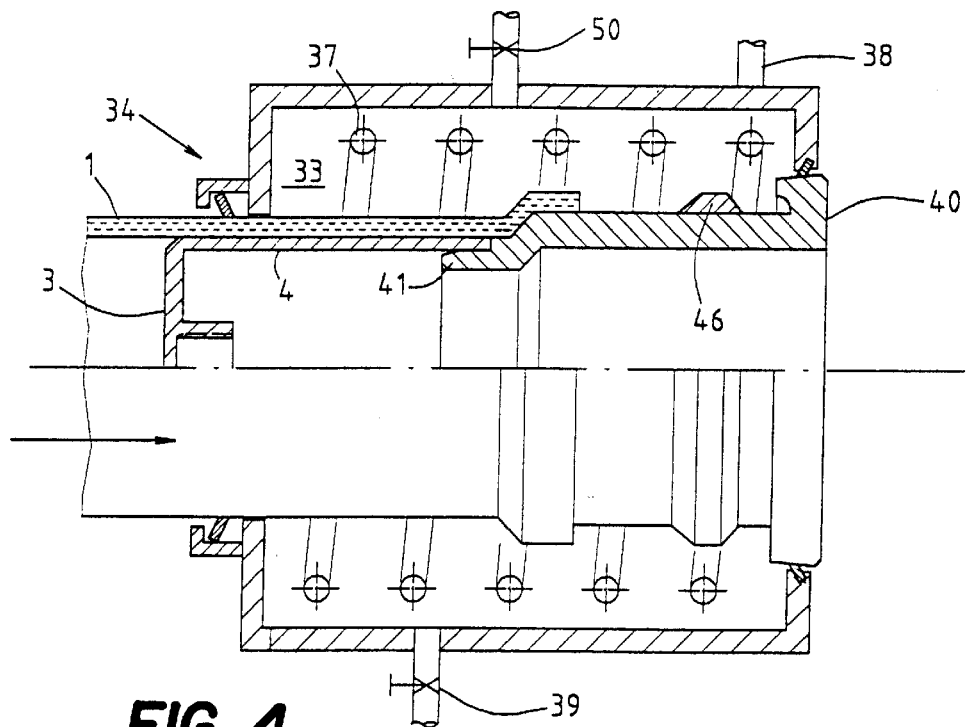
FIG. 4 shows the socket-forming station of FIG. 1c as the pipe is pushed onto the socket-forming mandrel.

To form the socket on the pipe 1, the end section, heated to the socket-forming temperature, of the pipe 1, together with the support sleeve 3 gripped therein, is introduced into the socket-forming station 30 via the insertion hole 32. In the process, the slip-on section 41 of the mandrel 40 enters the support sleeve 30 and thus effects centring of the support sleeve 30 and consequently of the pipe 1 with respect to the mandrel 40. Then, as FIG. 4 shows, the pipe 1 is pushed further over the mandrel 40 and then, via the transition section 43, moves onto the socket-forming section 45 of the mandrel 40. Then the end of the pipe 1 moves past the sealing ring 46 placed on the mandrel 40.

Although the plastic material of the biaxially oriented pipe 1 has a pronounced tendency to shrink at the socket-forming temperature, a good fit of the pipe 1 against the sealing ring 46 and that section 47 of the mandrel 40 which is situated behind the sealing ring 46 proves difficult to achieve. To achieve a good fit of the sealing ring 46, thereby ensuring that it is trapped, the method provides for the chamber 33 to be pressurized after the pipe 1 has been pushed completely onto the mandrel 40, possibly in conjunction with a reduced pressure being generated on the external surface of the mandrel 40 between the mandrel 40 and the pipe 1. The chamber 33 can be pressurized, because it is sealed by the seals 34 and 36. It was found that an external pressure of about 2.5 bar on the heated end section of the pipe 1 gives good results with a pipe of biaxially oriented PVC having a diameter of 160 mm and a wall thickness of 4 mm. Incidentally, in FIG. 4 the coolant line has been omitted for the sake of clarity.

Figure 5:
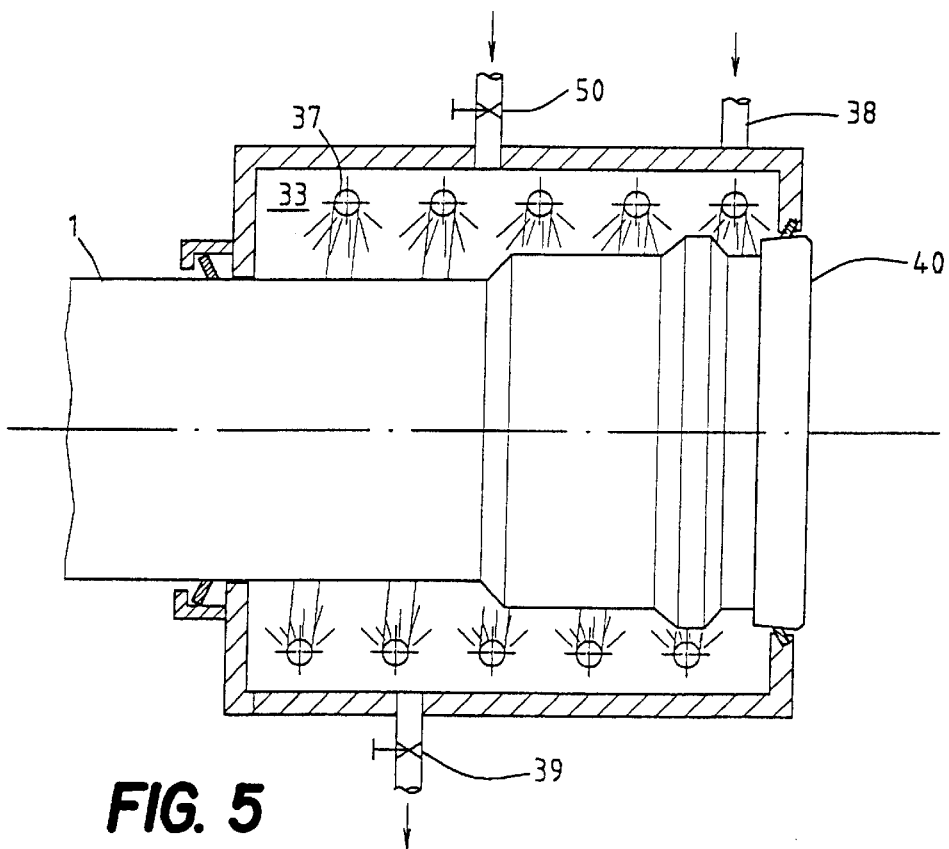
FIG. 5 shows the socket-forming station of FIG. 1c as the socket formed is being cooled.

Once the end section of the pipe 1 has been pushed completely over the mandrel 40 and, possibly with the aid of the external pressure on the pipe 1, the desired fit has been achieved and the socket has its intended shape, cooling water is then sprayed onto the end section which cools as a result and becomes dimensionally stable. This is indicated schematically in FIG. 5. The cooling water can flow out of the chamber 33 via the then open shut-off valve 39. Then the mandrel 40 is pulled out of the pipe 1, whereupon the pipe can be removed from the socket-forming station 30. Finally, a pulling element can be screwed to the socket 6 of the support sleeve 3, which at that point is still inside the pipe 1, and the support sleeve 3 can be removed from the pipe 1. Obviously it is also possible for coupling means to be provided which temporarily secure the support sleeve 3 to the mandrel 40, so that the support sleeve 3 can be pulled out of the pipe 1 together with the mandrel 40.

As a result of the method described here, the pipe 1 is fitted with a high-quality socket while at the same time a high production capacity can be achieved.

As a result of the end face of the end section of the pipe 1 lying against the shielding plate 14, said end face is thermally insulated from the external heating means. As a result, excessive heating of said end face and in particular of its outermost edge is avoided.

In a variation on the inventive concept, provision can be made for heating the pipe 1 by means of a circulation of warm air and in so doing surrounding the end face by a shielding ring which keeps the flow of the warm air away from the end face of the pipe.

In yet another variation it is conceivable for the shielding plate 14 to be absent and for an air blow ring to be situated at a distance from the end face of the pipe 1, such a ring comprising a plurality of air nozzles which are directed towards the end face of the tube 1 and which blow cooling air against the end face.

When the pipe 1 is pushed over the mandrel 40, the support sleeve 3 is, as it were, pushed further into the pipe 1. It should be noted in this context that the support sleeve 3 has a slightly smaller diameter than the internal diameter of the unheated section of the pipe 1. Since the support sleeve 3 at that instant is still warm, it is necessary to prevent the support sleeve 3 from coming to lie at the bottom of the pipe 1 and the pipe 1 from being overheated there. Centring the support sleeve 3 on the mandrel 40 prevents this effect. Optionally, provision can be made for the support sleeve 3 to be cooled at the instant it is forced into the pipe 1.

The use of the support sleeve, which is separate from the socket-forming mandrel, allows the heating to take place in one of more separate heating stations, so that it is not necessary for relatively prolonged heating of the pipe to take place in the socket-forming station. Optionally, in the case of a single socket-forming station, provision can be made for a plurality of preheating stations and subsequent heating stations, so as to make optimal use of the capacity of the socket-forming station. A separate preheating oven can be provided for preheating the support sleeves.

Obviously, forming the socket via the method according to the present invention may also involve the use of other mandrel designs, an expandable mandrel, for example, being conceivable in this context.

What is claimed is:

1. A method for forming a socket on a pipe of thermoplastic material, comprising the following steps:

an end section, to be provided with a socket, of the pipe is heated in a heating station, the pipe with the heated end section is transferred to a socket-forming station which comprises a socket-forming mandrel, the socket-forming station being set up in such a manner that a pipe can therein be provided with a socket, while the end section of another pipe can simultaneously be heated in the heating station, the socket-forming mandrel is introduced into the pipe end section, heated to a suitable socket-forming temperature, and the end section is formed into a socket, the pipe is cooled in the region of the socket, and the socket-forming mandrel is removed from the pipe, wherein prior to the pipe end section being heated in the heating station, a support is introduced into the end section of the pipe, said support extending substantially over the length of the end section in order to internally support the end section, and wherein, when the pipe with the heated end section is transferred to the socket-forming station, the support remains in the end section, after which the socket-forming mandrel is introduced into the pipe and in the process the support is pushed deeper into the pipe.

2. A method according to claim 1, wherein the end section of the pipe, with the support positioned therein, is preheated in a preheating station so that a preheating temperature is attained, the pipe then, with its preheated end section internally supported by the support, being transferred to a subsequent heating station, the end section in said subsequent heating station being heated further, after which the pipe, with its heated end section internally supported by the support, is transferred to the socket-forming station.

3. A method according to claim 1, wherein the end section of the pipe, with the support positioned therein, is preheated in a preheating station so that a preheating temperature is attained, the pipe then, with its preheated end section internally supported by the support, being transferred to a subsequent heating station, the end section in said subsequent heating station being heated further, after which the pipe, with its heated end section internally supported by the support, is transferred to the socket-forming station, and wherein during the transfer of the pipe from the one station to the next no additional heat is supplied to the pipe, so that equalization of the temperature of the end section takes place.

4. A method according to claim 1, wherein the pipe is made of biaxially oriented thermoplastic material, and wherein the support, as a result of shrinkage resulting from the heating of the end section, is gripped in the pipe.

5. A method according to claim 1, wherein the support is preheated prior to being placed in the pipe.

6. A method according to claim 1, wherein the heating of the end section of the pipe takes place entirely or in part by means of heating means which heat the support introduced into the end section from the inside.

7. A method according to claim 1, wherein a support is used which has a thin circumferential wall which, when supporting the pipe, internally fits the pipe and which is made of a material having good thermal conductivity.

8. A method according to claim 1, wherein the support is cooled when it is pushed deeper into the pipe by the insertion of the socket-forming mandrel.

9. A method according to claim 1, wherein the pipe is made of biaxially oriented polyvinylchloride and the end section is preheated, while internally supported by the support, so that the end section attains the glass transition temperature of polyvinylchloride substantially homogeneously and is then, while internally supported by the support, heated further so that the end section substantially homogeneously attains a temperature near the orientation temperature of polyvinylchloride.

10. A method according to claim 1, wherein the pipe, while being heated, is rotated about its longitudinal axis with respect to the heating means of the heating station.

11. A method according to claim 1, wherein, for the purpose of forming the pipe into a socket in the region of the heated end section, after the socket-forming mandrel has been moved into said end section, an external gas pressure is exerted on the end section for the purpose of pressing the end section against the socket-forming mandrel.

12. A method according to claim 1, wherein a heating station comprises external heating means and wherein the end face of the end section of the pipe is shielded so as to insulate it thermally from said external heating means.

13. A method according to claim 1, wherein, while the internally supported end section of the pipe is being heated, the end face of that end section is cooled.

14. A method according to claim 1, wherein the support and the socket-forming mandrel are provided with cooperating centring means working which centre the pipe, when placed in the socket-forming station, with respect to the socket-forming mandrel.

15. A method according to claim 1, wherein the end section, while internally supported by the support, is heated so that the end section substantially homogeneously attains a temperature above the orientation temperature of polyvinylchloride but less than about 120° C.

16. A method according to claim 12, wherein the pipe, while being heated, and a shield contacting the end face of the end section of the pipe, are rotated together about a longitudinal axis.

17. A method according to claim 2, wherein heating of the end of the pipe is accomplished by convective circulation of warm air around the end of the pipe.

18. A method according to claim 1, wherein the end face of the end section of the pipe abuts a ring comprising a plurality of air nozzles which are directed toward the end face and wherein the end face is cooled by air being blown out of the nozzles.

19. A method according to claim 1, wherein the socket-forming mandrel is expandable.

* * * * *